United States Patent Office 3,005,780
Patented Oct. 24, 1961

3,005,780
STABILIZED TETRAETHYLLEAD ANTIKNOCK COMPOSITIONS
William Thomas Robinson, Wilmington, Del., assignor to E. I. du Pont de Nemours and Company, Wilmington, Del., a corporation of Delaware
No Drawing. Filed June 11, 1958, Ser. No. 741,237
6 Claims. (Cl. 252—386)

This invention relates to the stabilization of tetraethyllead antiknock compounds to provide a practical and significant method for preventing the formation of haze and insoluble sludge from tetraethyllead antiknock compounds under conditions normally encountered in the industry on storing, shipping and handling these compounds.

Tetraethyllead is manufactured commercially by alkylating a lead-sodium alloy with ethyl chloride. After the reaction is complete, the tetraethyllead is steam-distilled from the reaction mass. The steam-distilled product is usually further purified by treatment under oxidizing conditions, as by blowing with air, to convert objectionable contaminants, such as organo derivatives of bismuth and of other metallic impurities originally present in the lead employed in such process, to an insoluble precipitate which is removed. These contaminants are objectionable as they are less stable than tetraethyllead and tend to decompose, forming sludge, in storage. The thus purified tetraethyllead is then blended with other agents, according to specifications governing its use, to produce finished antiknock additives for automotive and aviation fuels. Such blended products are liquids, commonly referred to as tetraethyllead antiknock compounds, and are comprised generally of tetraethyllead, selected halohydrocarbons such as ethylene dichloride or dibromide (which are scavengers for lead in combustion processes), a dye for marking the particular blend, and, an inert solvent oil such as kerosene. The blends are stored, transported and handled in drums, shipping and storage tanks, and in other auxiliary equipment, which for reasons of economy are of ferrous metal construction and which, in part, may be constructed of other metals such as bronze fittings, nozzles, filter screens and the like. Invariably in such systems, water and air are present along with the antiknock composition.

Water may be carried into the system dissolved in the antiknock composition, or it may be present as a film on the walls of the containing vessel, or it may enter the system as moist air during the loading operation; occasionally it is present as a separate phase (usually droplets of water that remained in a tank after it has been cleaned). Under such conditions in presence of even relatively minute quantities of water and oxygen, the tetraethyllead antiknock compositions are especially prone to deteriorate, with the formation of haze and sludge. This occurs even though the tetraethyllead used in such formulations had been substantially freed of the sludge-forming impurities described above.

The products of this decomposition are derived largely from organo lead and the ethylene halides, i.e., they contain chemically bound lead and halogen. Though actually representing a relatively very small proportion of the tetraethyllead composition, such deterioration constitutes an important economic and technical problem, when viewed in terms of the large volume usage of the product and of the further effects of such loss of materials and the presence of the products of deterioration on such usage. For example, haze and sludge in the antiknock compound are troublesome when unloading, since such matter tends to clog delivery lines and filters. As a result, frequent costly and time-consuming cleanings of the equipment are required.

Because of the great cost that would be entailed, it is impractical on a commercial scale to provide means for excluding water and oxygen from the system and for maintaining the system free of such impurities. Heretofore, various other expedients have been suggested for separately controlling either the decomposition of the antiknock compound; however, none have solved the described problem, as evidenced by the fact that the problem still exists.

It is an object of the present invention to inhibit the deterioration of and thus effect an unexpected degree of stabilization of blended tetraethyllead antiknock compounds under conditions normally encountered.

These and other objects will become apparent in the following description and claims.

More specifically, the present invention is directed to the use of a stabilizing quantity of a stabilizing composition comprising an aqueous alkaline solution of a water-soluble alkali metal or alkaline earth metal nitrite maintained in contact with a tetraethyllead antiknock mix whereby the deterioration of the antiknock compound is inhibited.

In practice, the stabilizing composition will be contained along with the tetraethyllead antiknock compound in a drum, shipping tank or storage vessel normally employed for such purpose. Normally the stabilizing solution will provide a metal nitrite, as defined, in quantities corresponding to about 0.005 to 5% by weight of the tetraethyllead antiknock compound to be stabilized; less than .005% by weight of metal nitrite does not give sufficiently effective results and the use of more than 5% by weight of nitrite would not give any practical increase in stabilization and would, therefore, be wasteful.

The stabilizing solution may contain from about 1 to 20% by weight, preferably about 2.5–10%, of a water-soluble alkali metal or alkaline earth metal nitrite, and will have a pH which is preferably decidedly alkaline, i.e., a pH of at least 8–10, but which may be as low as 6 and as high as 12. A pH factor of lower than 6 would result in the formation, for example, of nitrous acid and a resulting acidity factor which would promote deterioration of a tetraethyllead mix; the use of a pH higher than 12, a very alkaline system, would promote hydrolysis of the scavenger and result in increased undesirable precipitation. Sodium nitrite is preferred for its low cost and high effectiveness but other water-soluble alkali metal and alkaline earth metal nitrites may also be used. Since the metal nitrites are too weakly basic for practical use alone, the desired alkalinity of their aqueous solutions can be attained and maintained by adding a water-soluble oxide, or hydroxide of an alkali or alkaline earth metal, the components being chosen so as to provide a homogenous aqueous solution.

Also the desired alkalinity can be obtained by the addition of salts of such strong bases as the alkali metal hydroxides with weak acids such as boric acid and silicic acid, for example, sodium borate, or borax, or sodium meta-silicate. Alternately, such strong base and such weak acid can be added separately to the aqueous nitrite solution to produce, in situ, the desired salt of the strong base and weak acid. The presence of such components as sodium salts of boric and/or silicic acids in the stabilizing compositions of the present invention is preferred because they exert a buffering action which helps maintain the stabilizing composition in the desired pH range.

These stabilizing compositions may also contain substantial quantities of a hydroxylic compound, such as glycerine, which is miscible with water but which is substantially immiscible with the tetraethyllead antiknock composition. The use of such an additive as glycerin may be preferred where it is desired to formulate stabilizing compositions having greatly lowered freezing points for use in stabilizing the tetraethyllead compositions during cold weather at subnormal temperatures. For example, a solution consisting of 5% by weight of sodium nitrite and buffered to a pH of 10 with boric acid and sodium hydroxide has a freezing point of about 26° F. If this solution is diluted with an equal volume of glycerin, a stabilizing solution is produced having a freezing point of about −15° F. When glycerin is to be employed for this purpose at least about 20 volume percent is preferred.

As stated above, these novel stabilizing compositions may contain about 1–25% by weight of a metal nitrite as defined, preferably 2.5–10% sodium nitrite. Such solutions will be employed in quantities sufficient to provide from about .005 to 5%, preferably .01 to 1% of sodium nitrite based on the total weight of the antiknock composition. Preferably also the quantity of stabilizing solution (which solutions are less dense than and immiscible with the tetraethyllead antiknock compositions) will be sufficient to provide a continous blanketing layer of solution over the charge. Preferably also, so as not to cut too deeply into the vessel's capacity for the antiknock compound, the quantities of the solution and of the nitrite contained therein will be the lowest practical for achieving the desired results. Blanketing solutions containing about 5% sodium nitrite and having a thickness over the charge of about ⅛ to ¼ inch are satisfactory under storage conditions. The quantities of solution needed for this depends then also on the dimensions of the container. Railroad tank cars carrying charges of about 38,500 pounds (small car) and 75,000 pounds (large car) of antiknock compositions, at about 97% capacity, will normally be charged with about 40 to 120 pounds of a 5% aqueous sodium nitrite solution of this invention, to provide a stabilizing blanket of nitrite solution at least about ⅛ inch thick.

Tanks such as these are insulated for use in all climates, and ordinarily the contents are not subjected to extremes of climatic temperatures. The stabilizing compositions however are adapted to inhibit deterioration of the antiknock compositions over a relatively wider range of temperatures, such as for example about 0° F. to about 100° F.

The tetraethyllead antiknock compounds (mixes) most commonly employed today as fuel additives are of two general types—Aviation Mix and Motor Mix—both consisting essentially of tetraethyllead, ethylene dihalide and a characteristic dye. Aviation mixes normally contain sufficient ethylene dibromide to furnish 2 atoms of Br for each atom of Pb. Motor Mixes generally contain about 2 atoms of Cl as ethylene dichloride for each atom of Pb and about 1 atom of Br as ethylene dibromide for each atom of Pb. Also available are mixes in which the particular halohydrocarbon scavenging agents and their proportions vary somewhat from the above general rule. The method of the present invention is applicable to all such types of antiknock compounds.

The stabilizing solutions of this invention have no adverse effect on the tetraethyllead antiknock compositions or on any of its components, including the identifying dyes which are those conforming to Military and ASTM gasoline specifications. In storage tests of several months duration, such compositions treated according to the method of this invention show no significant losses in tetraethyllead or scavenger content, remain substantially clear and free of insoluble matter, and undergo no adverse changes in antiknock quality of the blend or in its color specifications.

The present invention is illustrated in the following representative examples.

EXAMPLE 1

A stock aqueous 5% sodium nitrite stabilizing solution having a pH of about 10 was prepared as follows:

50 volumes of a 0.1 molar boric acid water solution were mixed with 43.9 volumes of a 0.1 Normal sodium hydroxide water solution, and sufficient water was added to bring the whole to a total of 100 volumes. To 95 parts by weight of the above solution (having a boric acid to sodium hydroxide mole ratio of 1.14:1) were added 5 parts of sodium nitrite, which dissolved, to produce a 5 weight percent $NaNO_2$—pH 10 stabilizing solution.

To illustrate the effectiveness of the above stabilizing solution in controlling the decomposition of tetraethyllead antiknock mixes, the following tests simulating field storage conditions were conducted simultaneously:

(A) 100 ml. (159 g.) of a typical commercial antiknock mix having the composition described hereinafter, along with 20 ml. of the above stabilizing solution (providing about 0.6% of $NaNO_2$ by weight of the mix), and a polished 1020 steel coupon having the dimensions 5 inches x ¼ inch x ⅛ inch were placed in a wide mouth pint jar. The steel coupon was positioned so that it passed through the antiknock mix (lower liquid layer), the aqueous phase (⅛ inch thick upper liquid layer), and the vapor space above these liquids. The jar was capped and stored in the dark at ambient temperatures for 30 days.

(B) Procedure A was repeated except that 20 ml. of water (distilled or South New Jersey tap water) were used in place of the stock stabilizing solution.

(C) Test B was repeated and, in addition to the 20 ml. of water, there was added 0.01% by weight, based on the antiknock mix, of a commercial oil-soluble and antiknock mix-soluble rust inhibitor.

(D) Procedure A was repeated except that neither stabilizing solution nor water was added to the system, i.e., the antiknock mix (which contained no separate water phase) was used as is.

At the end of the storage period the observations tabulated below were made on systems A–D:

| Test | Composition | Precipitate [1] | |
|---|---|---|---|
| | | mg./100 ml. | metal content, percent |
| A | TEL mix+$H_2O$+$NaNO_2$ | 3.4 | 50.1 Pb, 9.9 Fe. |
| B | TEL mix+$H_2O$ | 291 | 70.2 Pb, 14.9 Fe. |
| C | TEL mix+$H_2O$+commercial corrosion inhibitor. | [2] 308 | |
| D | TEL mix | 8.7 | |

[1] Collected, after removing the test coupon, by filtration and drying in air.
[2] The filtrate continued to develop haze and precipitate 24–36 hours after filtration.

The tetraethyllead antiknock compound (mix) employed in the above tests was composed of tetraethyllead 61.43%, ethylene dichloride 18.81%, ethylene dibromide 17.86%, kerosene and inerts 1.85%, and an orange-colored dye 0.05%.

From the above, the deleterious effects of the presence of gross quantities of water and the marked beneficial effects of the sodium nitrite solution are readily apparent.

The effectiveness of the subject stabilizing solution, which is substantially completely immiscible with the TEL mix, compared to the adverse effects of the commercial inhibitor composition, which is soluble in the TEL mix, is particularly surprising, since the latter and other such soluble additives are known to have no adverse effect on commercial gasolines containing TEL mix and other additives normally associated with such fuels.

As mentioned earlier, the formation of hydrogen halide by hydrolysis of the ethylene dihalide by hydrolysis of the ethylene dihalide scavengers of the TEL mix in contact with water contributes to the instability of the system; the hydrogen halides accelerate the formation of insoluble matter in the TEL mix. The inhibition of these deleterious effects by the method of this invention is illustrated in Examples 2 and 3 below.

EXAMPLE 2

The procedure for tests A and B of Example 1 was repeated, employing the stabilizing solution of Example 1 and a TEL mix having the composition described in Example 1. The jars containing the two test compositions were stored at ambient temperatures in the dark for a total of 21 days. The samples were vigorously shaken daily for a 5-minute period. The halide ion content (combined Br and Cl) in each aqueous layer was determined periodically by coulometric titration and the results, tabulated below, expressed as the percent of the total quantity of halogen that would be expected to appear in the aqueous layer if hydrolysis of the ethylene dihalides were complete.

*Inhibition of hydrolysis of ethylene dihalide scavenger*

| Test | Composition | Percent Available Halogen in Scavenger Hydrolyzed | | | |
|---|---|---|---|---|---|
| | | 3 days | 7 days | 14 days | 21 days |
| E | 100 ml. TEL mix+20 ml. $H_2O$ | 0.03 | 0.08 | 0.24 | 0.25 |
| F | 100 ml. TEL mix+20 ml. $H_2O$—NaOH at pH 10 | 0.04 | 0.04 | 0.04 | 0.05 |
| G | 100 ml. TEL mix+20 ml. of pH 10, 5% aqueous $NaNO_2$ | 0.04 | 0.07 | 0.08 | 0.08 |

The pH of the aqueous alkaline nitrite layer of test composition G, illustrating the invention, had changed slightly during the test period, and after 84 days was at pH 9; the test coupon in G was rust-free. In E, after 20 days, the water layer had fallen to pH 2, and the test coupon was quite noticeably rusted. Although in F the aqueous alkali alone was surprisingly effective in retarding the liberation of halide ion, it appeared to contribute to corrosion of the test coupon which was heavily rusted.

EXAMPLE 3

The preparation of test systems A and B of Example 1 was repeated, employing both a TEL Motor Mix and a TEL aviation mix having the compositions described hereinafter. To each mix was then added 0.7 ml. of concentrated aqueous hydrobromic acid, thereby the pH of the nitrite stabilizing solution was reduced from 10 to 6; that of the water blanket was reduced to a pH somewhat less than 1. Storage at ambient temperatures, in the dark, gave the following results.

*Storage time required for formation of heavy precipitate*

| Aqueous Layer | OMM (100 ml.) Precipitate | BAM (100 ml.) Precipitate |
|---|---|---|
| 20 ml. $H_2O$ nitrite blanket+ 0.7 ml. conc. HBr. | Trace after 1,050 hours storage. | Slight after 1,050 hours storage. |
| 20 ml. $H_2O$+0.7 ml. conc. HBr. | Heavy at 72 hours storage. | Heavy at 72 hours storage. |

*Composition of mixes*

| | OMM (Orange Motor Mix) | BAM (Blue Aviation Mix) |
|---|---|---|
| Percent TEL | 61.40 | 61.25 |
| Percent $EtCl_2$ | 18.81 | |
| Percent $EtBr_2$ | 17.86 | 35.68 |
| Percent dye | 0.05 | .02 |
| Percent kerosene and impurities | 1.88 | 3.05 |
| | 100.00 | 100.00 |

EXAMPLE 4

700 pounds of a commercial tetraethyllead antiknock mix having the composition described below were placed in each of two identical 55 gal. steel drums normally employed for storing and shipping such mix. 575 ml. of water (South N.J. tap water) were placed in one drum, and 1200 ml. of the stock 5% sodium nitrite—pH 10 solution of Example 1 (providing 0.02% $NaNO_2$ by weight of the mix) were added to the other. The drums were lidded and stored outdoors for 17 weeks from early fall (October 10) to late winter (February 10) during which time the temperature ranged from a high of about 80° F. to a low of about 13° F. Daily, except for weekends, the drums were agitated by rolling 10 minutes.

Analyses of samplings from the stored drums showed that, although the mix in each was still within specifications with respect to TEL content, specific gravity and color, the mix which was stored in the presence of plain water was hazy and contained sediment, and, the water layer was strongly acid; in comparison, the mix layer of the inhibited drum was substantially free of haze and sediment, and, the pH of the nitrite layer was 9.

Instead of the stabilizing composition described in the above examples, other typical stabilizing compositions for use in the method of the present invention such as those which may be prepared as follows, may also be employed for the intended purpose: 5 parts of sodium nitrite may be dissolved in (a) 95 parts of a 0.01 Normal sodium hydroxide water solution; in (b) 95 parts of a water solution obtained by mixing 60 volumes of 0.05 Molar borax ($Na_4B_4O_7.10H_2O$) with 40 volumes of 0.1 Normal sodium hydroxide; in (c) 90 parts water along with 5 parts sodium metasilicate.

The preceding representative examples illustrate the significance of the present invention in normal use. When stored in non-conventional containers such as glass-lined containers, the tetraethyllead mix is significantly inhibited against deterioration by utilizing applicant's described and claimed stabilizing aqueous alkaline nitrite solution in the manner disclosed.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A tetraethyllead antiknock composition consisting essentially of tetraethyllead and a halo-hydrocarbon scavenger agent for lead, said composition being maintained in contact with a nitrite compound taken from the group consisting of (1) water-soluble alkali metal nitrites and (2) water-soluble alkaline earth metal nitrites, said nitrite compound being present as an aqueous stabilizing solution of from about 1 to 25% by weight of said nitrite, said solution having a pH within the range of 6 to 12, said nitrite being present in an amount within the range of 0.005 to 5% by weight of said tetraethyllead antiknock composition, and, said aqueous alkaline nitrite solution being substantially immiscible with said tetraethyllead halo-hydrocarbon scavenger agent composition.

2. The composition of claim 1 wherein the aqueous nitrite stabilizing solution is present as a layer over and in contact with said tetraethyllead and halo-hydrocarbon scavenger agent composition.

3. The composition of claim 1 wherein the stabilizing solution contains from about 2.5 to 10% by weight of said nitrite.

4. The composition of claim 1 wherein the stabilizing solution has a pH within the range of 8 to 10.

5. The composition of claim 1 wherein the metal nitrite is present in an amount within the range of .01 to 1% by weight of the tetraethyllead antiknock composition.

6. A tetraethyllead antiknock composition consisting essentially of tetraethyllead and a halo-hydrocarbon scavenger agent for lead, said composition being maintained in contact with sodium nitrite, said nitrite compound being present as an aqueous stabilizing solution of from about 1 to 25% by weight of said nitrite, said solution having a pH within the range of 6 to 12, said nitrite being present in an amount within the range of 0.005 to 5% by weight of said tetraethyllead antiknock composition, and, said aqueous nitrite solution being substantially immiscible with said tetraethyllead halo-hydrocarbon scavenger agent composition.

References Cited in the file of this patent

UNITED STATES PATENTS

| | | |
|---|---|---|
| 2,004,160 | Downing et al. | June 11, 1935 |
| 2,067,331 | Michel | Jan. 12, 1937 |
| 2,292,352 | Cook et al. | Aug. 11, 1942 |
| 2,297,666 | Wachter | Sept. 12, 1942 |
| 2,316,739 | Cook et al. | Apr. 13, 1943 |
| 2,378,793 | Rudel | June 19, 1945 |
| 2,407,261 | Downing et al. | Sept. 10, 1946 |